United States Patent [19]

Jureit et al.

[11] 4,033,025

[45] July 5, 1977

[54] METHODS FOR FABRICATING WOODEN FRAMES AND THE LIKE

[75] Inventors: John Calvin Jureit, Coral Gables; Roy Leutwyler, Miami; Larry Brodsky, Miami; Benjamin Kushner, Miami; Adolfo Castillo, Miami, all of Fla.

[73] Assignee: Automated Building Components, Inc., Miami, Fla.

[22] Filed: July 30, 1975

[21] Appl. No.: 600,506

Related U.S. Application Data

[62] Division of Ser. No. 462,443, April 19, 1974, Pat. No. 3,939,548, which is a division of Ser. No. 317,095, Dec. 20, 1972, abandoned.

[52] U.S. Cl. .................................. 29/417; 29/432; 29/526; 227/86; 227/93; 227/152

[51] Int. Cl.[2] ........................................ B23P 17/02

[58] Field of Search ................. 29/417, 432.1, 432, 29/526, 243.57, 432, 417; 93/44.1, 56 R; 100/DIG. 13, DIG. 17; 227/84, 86, 93, 95, 96, 99, 152, 153; 206/338, 340, 343, 345, 346; 52/690–695

[56] References Cited

UNITED STATES PATENTS

| | | | |
|---|---|---|---|
| 598,307 | 2/1898 | Leffler | 227/86 |
| 2,242,967 | 5/1941 | Carlile | 206/343 X |
| 2,838,757 | 6/1958 | Holtkamp | 227/95 X |
| 3,088,381 | 5/1963 | Paist et al. | 93/41.1 |
| 3,207,406 | 9/1965 | Bowman | 227/152 |
| 3,705,452 | 12/1972 | Motta | 29/526 X |
| 3,713,381 | 1/1973 | Mort et al. | 227/152 X |
| 3,716,179 | 2/1973 | Frydenberg et al. | 227/152 X |
| 3,837,069 | 9/1974 | Nordgren | 29/417 X |

*Primary Examiner*—Victor A. DiPalma
*Attorney, Agent, or Firm*—LeBlanc & Shur

[57] ABSTRACT

The apparatus includes a conveyor table having press heads mounted on opposite sides. Coils of connector plate stock having prepunched integrally extending teeth feed upper and lower press platens movable toward one another to substantially simultaneously cut the connector stock to predetermined lengths to form connector plates and embed the teeth of the connector plates on opposite sides of joints formed by wooden frame members disposed on the conveyor between the press heads. Upon completion of the pressing operation, a feed mechanism locates predetermined lengths of connector stock between the press platens for the next cut and embedment operation. Selectively extensible and retractable stops are provided on the conveyor table and press heads against which respective webs and chords of the frame being fabricated are butted to locate the same in position forming a completed frame. Clamps on the conveyor press the chords against the web ends while the connector plates are embedded in the joints.

9 Claims, 21 Drawing Figures

METHODS FOR FABRICATING WOODEN FRAMES AND THE LIKE

This application is a divi_ion of co-pending application Ser. No. 462,443, filed on Apr. 19, 1974, now U.S. Pat. No. 3,939,548, which application is in turn a divisional application of co-pending application Ser. No. 317,095, filed Dec. 20, 1972, now abandoned in favor of U.S. patent application Ser. No. 448,006, filed July 12, 1974, and now U.S. Pat. No. 3,913,816.

The present invention relates to apparatus and methods for forming wooden frames and the like and particularly relates to apparatus and methods for providing discrete connector plates of the type having prepunched integrally extending teeth from coiled strips thereof and substantially simultaneously embedding the plates into the opposite sides of joints of prepositioned wooden members to fabricate a frame or the like. The present invention also relates to the coiled connector plate stock used in the frame fabricating apparatus hereof.

It is currently common practice to utilize connector plates of the type having integrally struck teeth to form the joints between the various members comprising a wooden frame. For example, connector plates of various sizes and widths, depending upon the structural requirements of the frames, are commonly embedded in the joints of wooden roof trusses and truss-type floor joists. An example of such connector plates is disclosed in U.S. Pat. No. 2,877,520 of common assignee herewith. To accomplish the foregoing, it is typical industry practice for a frame fabricator to preposition precut wooden members on a jig table in the form of the desired frame and spot precut connector plates on opposite sides of the frame joints. The fabricators then utilize various methods for embedding or pressing the teeth of the connector plates into the opposite sides of the joints to form the completed frame. An example of a fabricating system of this type is illustrated in U.S. Pat. No. 3,602,237 of common assignee herewith. In that patent, precut connector plates are spotted on a jig table on the opposite sides of the joints formed by the prepositioned wooden members, the jig table being then stepped through a press position whereby the joints are successively located between the platens of the press and the connector plates carried thereby embedded into the joints. In U.S. Pat. No. 3,603,244, also of common assignee herewith, the press is moved along the jig table and is automatically stopped at each joint position to embed the connector plates.

Currently, connector plates are provided frame fabricators in various sizes either cut exactly to the length required or in discrete sizes constituting a multiple of the required lengths. The fabricator cuts these latter longer connector plates to form connector plates of the required lengths. These connector plates, hereinafter sometimes referred to as bar stock, are very often packed by a supplier in one of two ways. The bar stock is either tumble-packed, i.e., the connector plates being randomly disposed in a box, or packed in teeth-to-teeth relation, i.e., paired connector plates in teeth-to-teeth facing relation. It will be appreciated that teeth-to-teeth packaging requires extensive manual labor to orient the discrete plates in proper position for such packaging. Tumble packing also requires a degree of labor to complete the packaging process and has the additional disadvantage of low density packaging. Furthermore, the fabricator, upon receiving the packages of connector plates, must unpack the plates and individually spot the plates at their proper locations as previously discussed. Where the connector plates are provided in multiples of the desired lengths, the fabricator must, of course, additionally cut these longer connector plates to the desired lengths prior to spotting. Thus, the current practices in providing connector plates to a frame fabricator and his handling of such plates up to final securement thereof in a frame requires considerable labor, time and expense.

It has therefore been found desirable to provide novel methods for handling connector plates of this type and to provide novel methods for fabricating wooden frames and the like. Generally, the present invention provides means of using novel and improved coiled connecting strips or stock of the type having teeth struck integrally therefrom whereby previously noted and other problems associated with handling connector plates are minimized or eliminated and also provides novel and improved methods for utilizing the coiled connector stock by a fabricator including methods for substantially simultaneously cutting connector stock to the required lengths to form connector plates, locating the plates on opposite sides of the joints of the frames, and embedding the teeth of the connector plates into such joints. The following description of a coiled connector strip or stock and frame fabricating machine relates to an embodiment of the present invention particularly useful for fabricating wooden pallets. It will be appreciated, however, that the methods as described herein can be utilized in the fabrication of a wide variety of wooden frames and the like including but not limited to trusses, wall panels and truss-like floor joists. With respect to the specific embodiment of the present invention disclosed herein, there is provided generally a method for fabricating pallets adapted to carry coils of connector stock of the type having teeth integrally struck therefrom and which coils constitute a magazine from which the connector stock is fed to the machine. The machine is provided with a feed assembly which unwinds the coils and advances leading portions of the coils discrete distances toward a press-cut-off assembly, each advance corresponding in distance to the length of the connector plate desired. At each press-cut-off assembly, two discrete lengths of connector strip are cut from the connector stock and the teeth of the connector plates thus formed are substantially simultaneously embedded into the opposite sides of the joint of prepositioned wooden members forming a part of the frame being fabricated.

More particularly, the pallet machine disclosed herein includes a conveyor mounting upper and lower press head assemblies on C-frames on opposite sides of the conveyor. Each press head assembly includes a platen, upper and lower platens being located on opposite sides of the frame members on the conveyor and movable toward and away from one another. Stops are carried by the upper press head assemblies for aligning the chords in a pressing position. Stops are carried by the conveyor between the press-cut-off assemblies on opposite sides of the conveyor for aligning the first and second webs in respective pressing positions. Clamps carried on the conveyor squeeze the chords against the ends of the webs. Each press platen carries a cutting blade which cooperates with a fixed cutting blade to cut a selected length of connector plate from the coiled connector stock fed to such press head assembly by the feed assembly. The upper and lower press platens carry the connector plates for embedment into the joint during the final portions of their movement toward one another.

Generally, to complete a frame, the chords and webs are disposed on the conveyor with the chord ends butting the stops carried by the upper press head assemblies and the first web butting the stops carried by the conveyor between the press-cut-off assemblies. Upon actuation, the upper and lower press platens move toward one another cutting predetermined lengths of connector plates from the connector stock. The upper and lower platens carry the plates for embedment into the opposite sides of the joints during the final portions of their strokes. Upon retraction of the platens, the stops for the chords and web are also retracted. In this manner, the partially completed frame comprised of two chords and a first web may be advanced along the conveyor. Particularly, this three-part pallet is advanced by a power roller until the first web butts stops carried by the conveyor spaced a distance from the press heads corresponding to the length of the frame whereby the trailing ends of the chords are located between the press platens. The second web is moved forwardly with the three-part frame until it butts the web stops in line with the press heads whereby the second web is located between the trailing ends of the frame and in a pressing position. As the partially completed frame is advanced and after the first cutting and pressing cycle, the feed mechanism advances the connector stock toward the press head assemblies to locate predetermined lengths thereof between the press platens. Once the trailing web and the chords are positioned between the press head assemblies, the press platens are again actuated to cut connector plates from the stock and embed the teeth thereof into the opposite sides of the joint on opposite sides of the conveyor.

It will be appreciated that significant material handling problems are encountered with respect to connector plates particularly in view of the projecting teeth thereof and that such problems are solved by the present invention in the provision of coiled connector plate stock compatible with a machine which substantially simultaneously cuts the stock and embeds the connector plates thus formed into the joints of a frame. Features of the present machine include the provision of comb-like guides or tines on the fixed cutting blades and in the feed mechanism whereby the machine is virtually jam-proof. The teeth of the connector stock engage in the grooves between the tines and guide surfaces on the opposite sides of the stock from the teeth maintain the stock between the guide surfaces and the edges of the tines. Thus, only longitudinal feeding movement of these stock is permitted with the stock being held against lateral movement by the tines and against movement withdrawing the teeth from between the tines by the guide surfaces. A further novel feature of the present invention resides in the feed mechanism which not only insures that the connector plates are cut to the desired predetermined length but also that the connector stock is cut at a longitudinal location between its teeth. From U.S. Pat. No. 2,877,520, it will be noted that connector plates are provided with teeth arranged in both longitudinal and transversely extending rows. It is important that a transverse row of teeth not be aligned at the juncture of the fixed and movable cutting blades so that the teeth per se are not sheared or weakened by the shearing process. It will be appreciated that connector plates do not have identical tooth-to-tooth spacing in a longitudinal direction. That is to say, an inherent characteristic of a connector plate or stock of this type is that the teeth are spaced from their theoretical longitudinal positions progressively further distances in proportion to the length of the stock being fabricated. Accordingly, cumulative error in the longitudinal location of the transverse rows of teeth would result in locating one such row of teeth between the fixed and movable cutting blades. In the machine hereof, however, the connector strip is always cut at a location such that the cutting blades shear through the connector plate per se without engaging any teeth. To accomplish this, a pilot pin is inserted between a pair of transverse rows of teeth prior to each feed to longitudinally adjust the stock relative to the cutting blades to ensure that the teeth are not alingned therewith. The slight error in the location of the teeth relative to one another over the small length of plate between the pin and cutting blades is insignificant and the cut is thereby made substantially medially between next adjacent transversely extending rows of teeth. Thus, the teeth on the opposite sides of the cut remain effective in both the connector plate just formed and the next connector plate to be formed.

A further important feature of the present invention resides in the provision of a fixed cutting blade having a comb-like surface, i.e., tines. The teeth of the connector stock are received between the tines and the ends of the tines support the plate during the shearing operation. The tines thus provide the reaction force for the cutting operation.

A still further important feature of the present invention resides in accurately locating the plate in the joint. It will be appreciated that the plate when cut from the stock tends to first bend away from the movable cutting platen and then jumps from the platen and stock when fully sheared therefrom. To prevent this, the present invention provides a device for holding the plate when it is sheared from the stock. The device includes a dovetail notch or groove carried on the movable cutting blade and a corresponding dovetail projection carried on the fixed blade. When the plate is cut from the stock, a dovetail notch is formed along its trailing edge leaving a dovetail projection on the leading edge of the stock. The dovetail notch on the cut plate engages with the dovetail projection of the fixed cutting blade whereby the plate is held against lateral and longitudinal movement relative to the machine. That is, the plate is held by the dovetail until just prior to embedment of the teeth into the joint. To prevent the forward end of the plate from bending away from the moving platen when cut, a magnet is located on the platen to hold the plate thereagainst. Spring-biased plungers or spring clips may also be utilized on the platens to provide lateral support for the connector plate. These locators ensure that after each plate is cut from the connector stock, it is carried to the joint and located precisely relative thereto.

Accordingly, it is a primary object of the present invention to provide novel and improved methods for fabricating wooden frames and the like.

It is still another object of the present invention to provide novel and improved methods for substantially simultaneously cutting the connector plates of the type having integrally struck teeth from a coiled strip thereof and embedding the teeth of the connector plates into the joint of a wooden frame.

It is a related object of the present invention to provide novel and improved methods for applying connector plates of the type having integrally struck teeth on the opposite sides of wooden frames and the like.

It is a further object of the present invention to provide a novel and improved methods for fabricating wooden frames and the like and including a novel feed method for accurately aligning the connector strip with the cutting blade of the machine.

It is a related object of the present invention to provide a novel and improved method for manufacturing wooden frames and the like having the foregoing characteristics.

These and further objects and advantages of the present invention will become more apparent upon reference to the following specification, appended claims and drawings wherein:

Figures 4, 9, 9A:
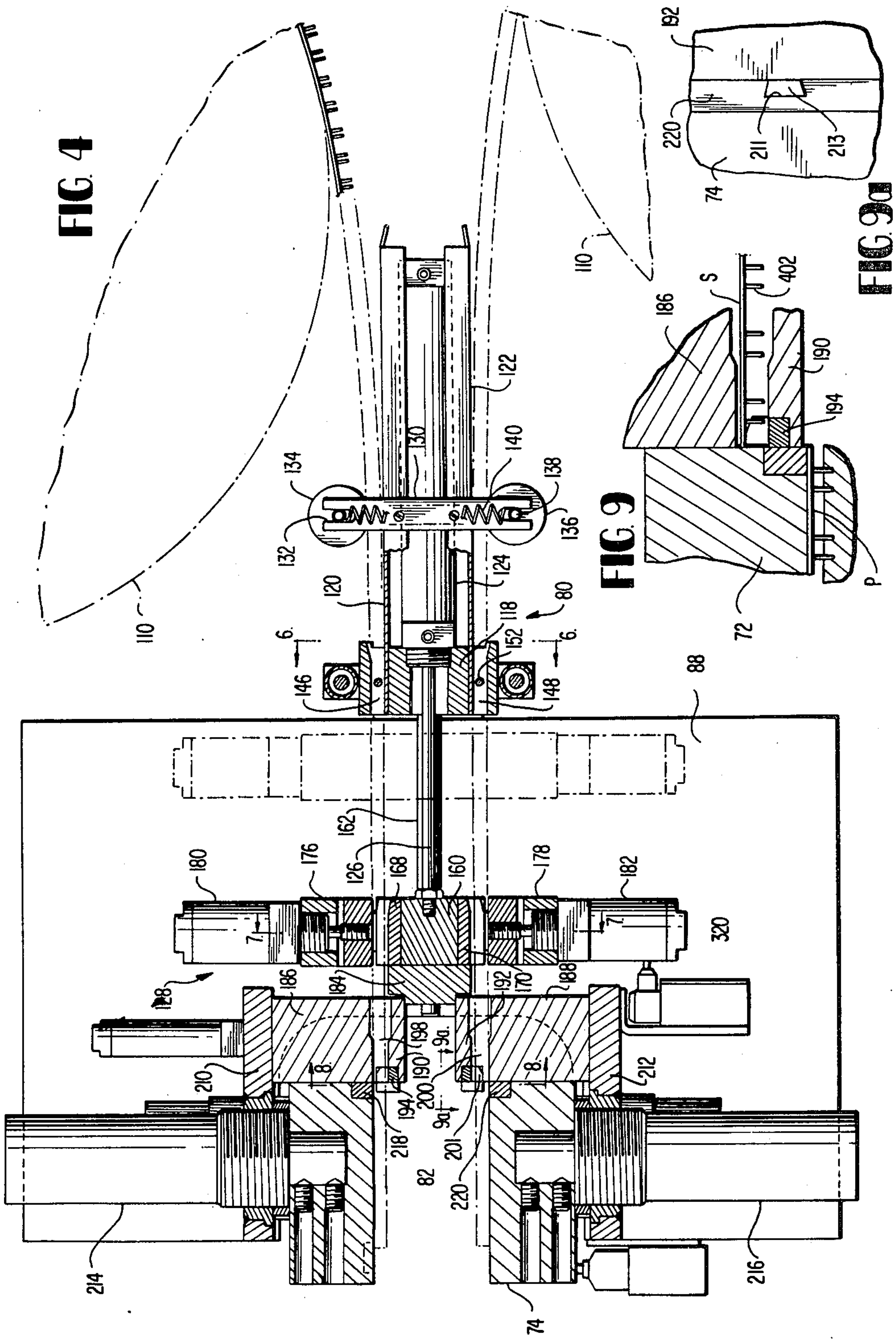
FIG. 4 is an enlarged fragmentary cross sectional view of a feed and press assembly forming a part of the fabricating machine illustrated in FIG. 1.
Figures 5, 6, 7, 8:
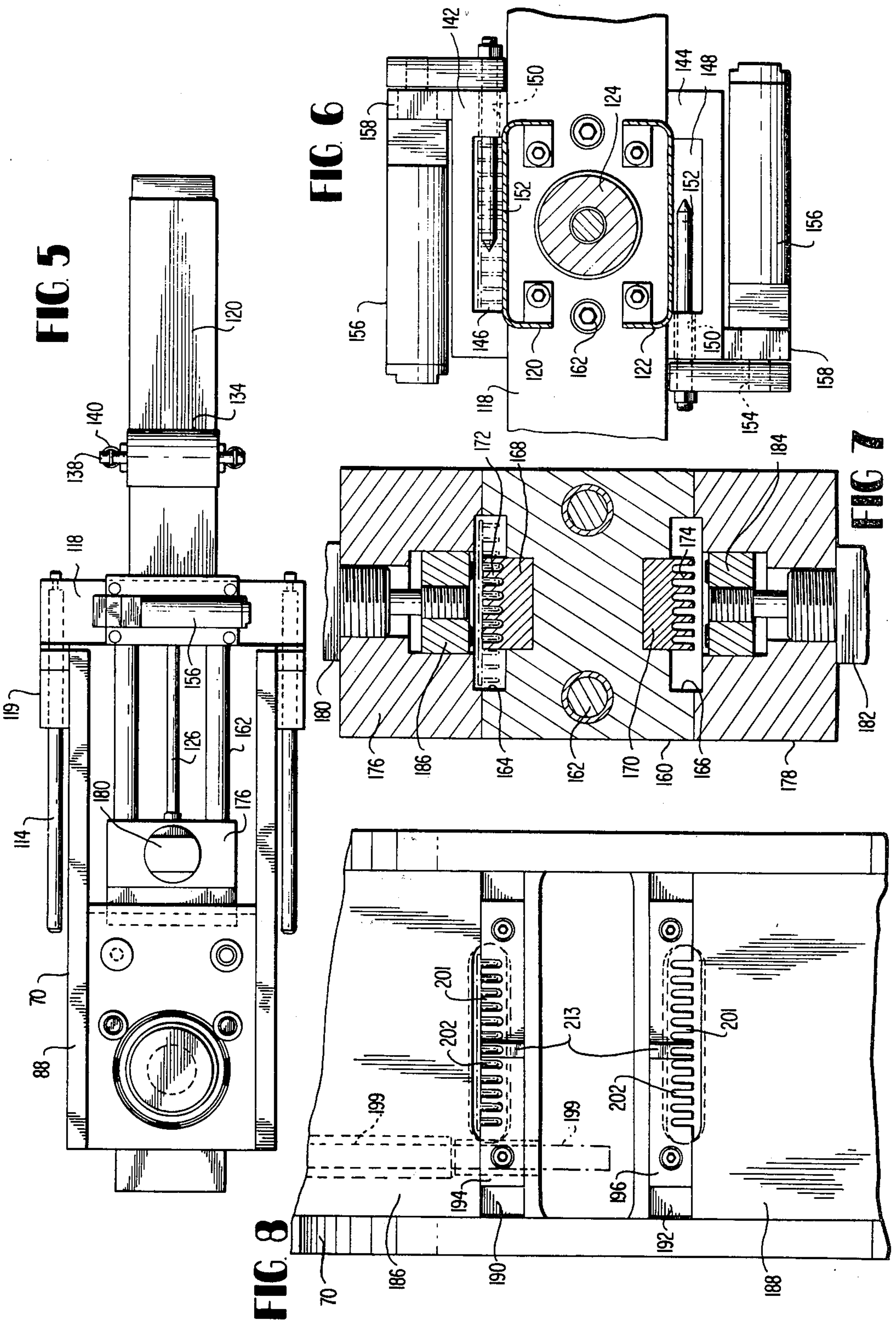
FIG. 5 is an enlarged plan view thereof.
Figure 9B:
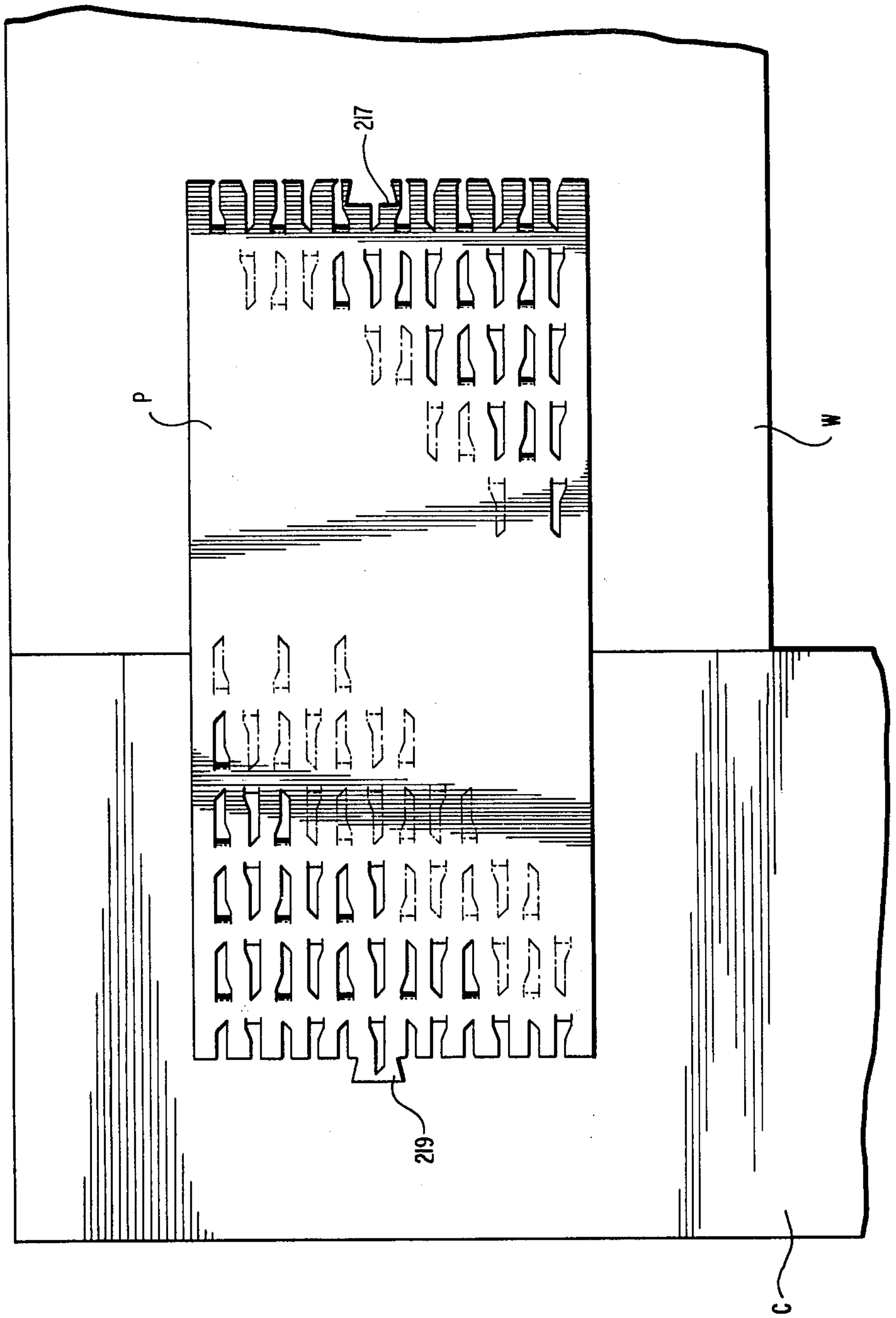
Figure 10:
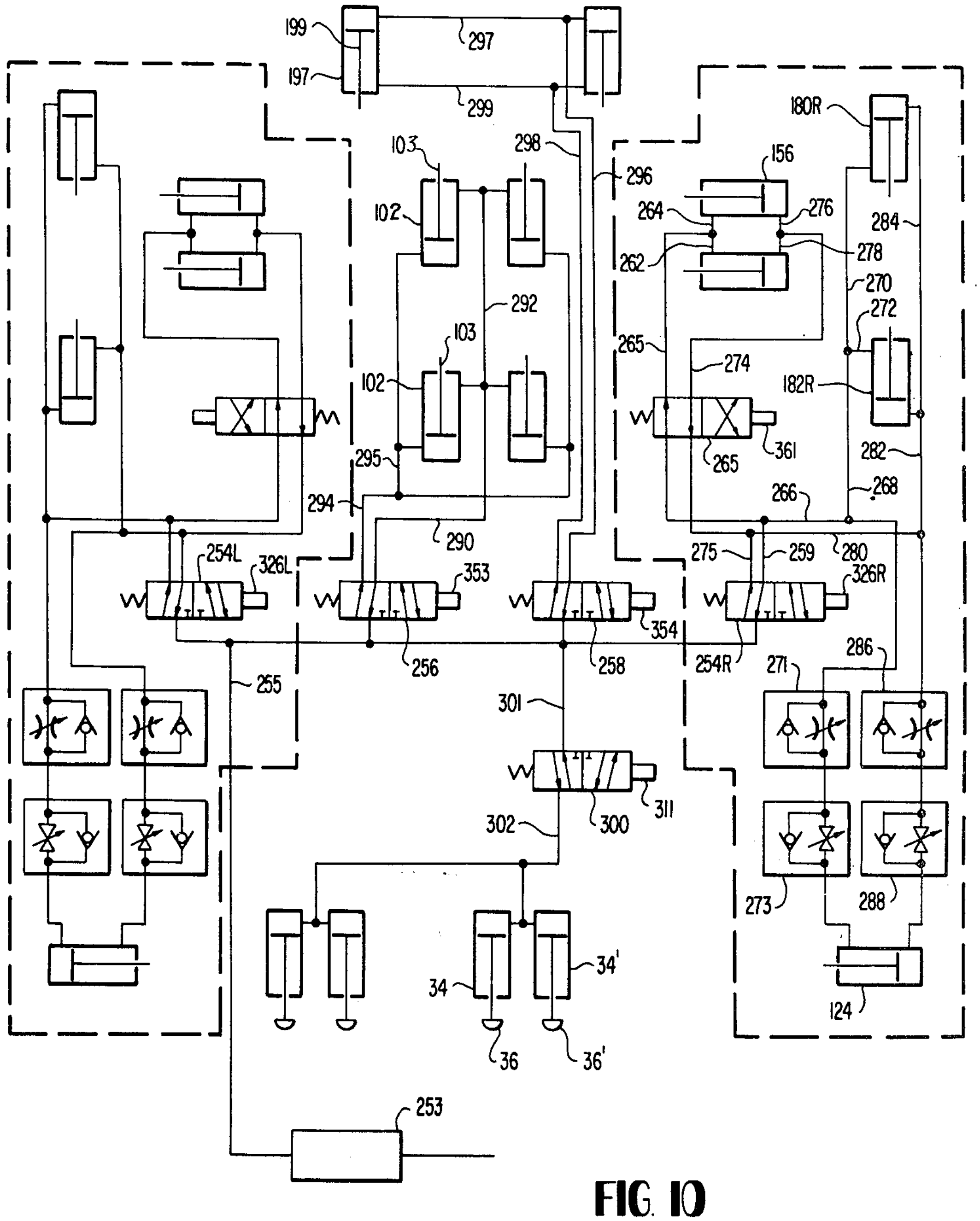
Figure 11:
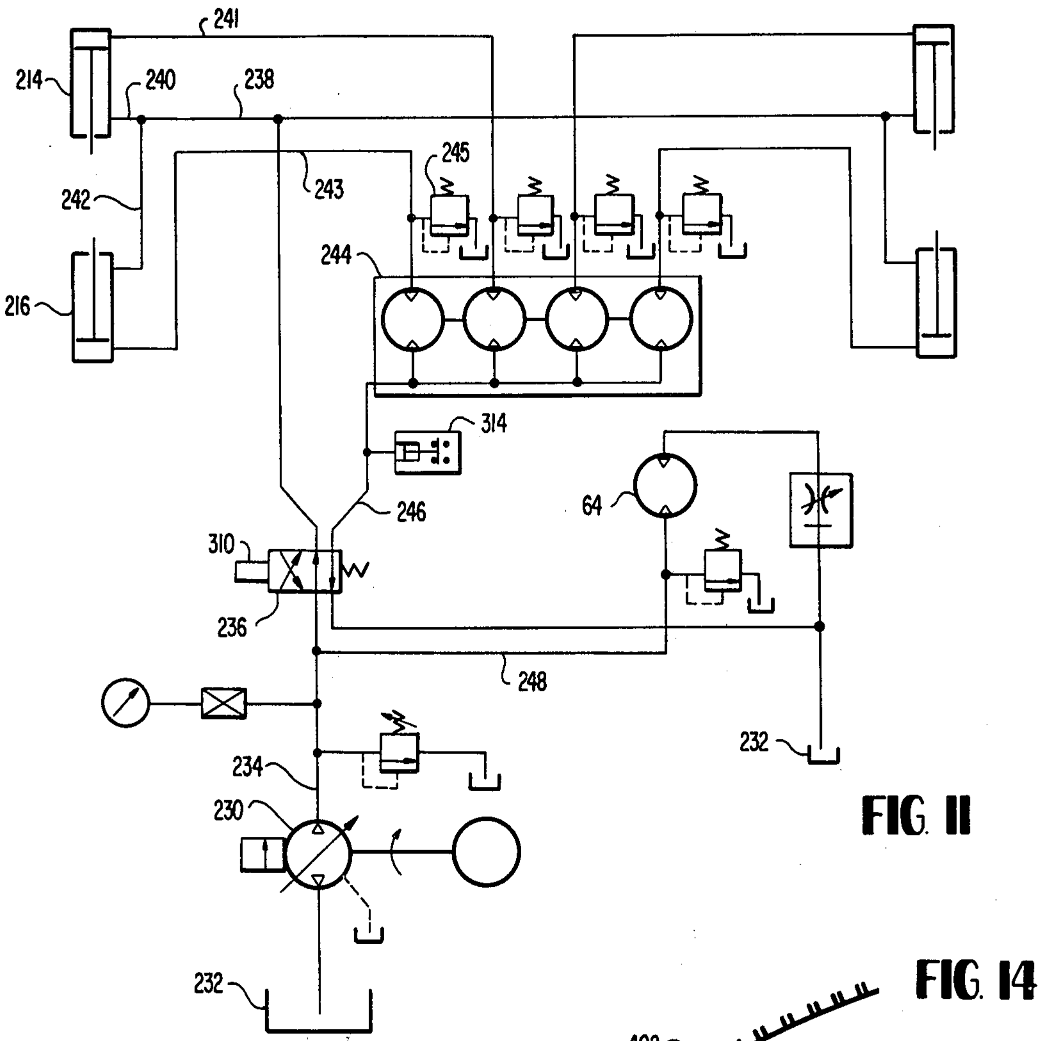
Figure 13:
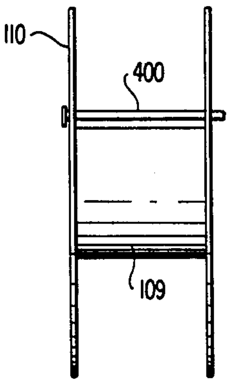
Figure 14:
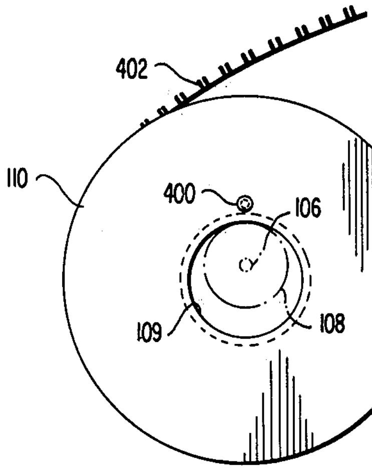
Figure 12:
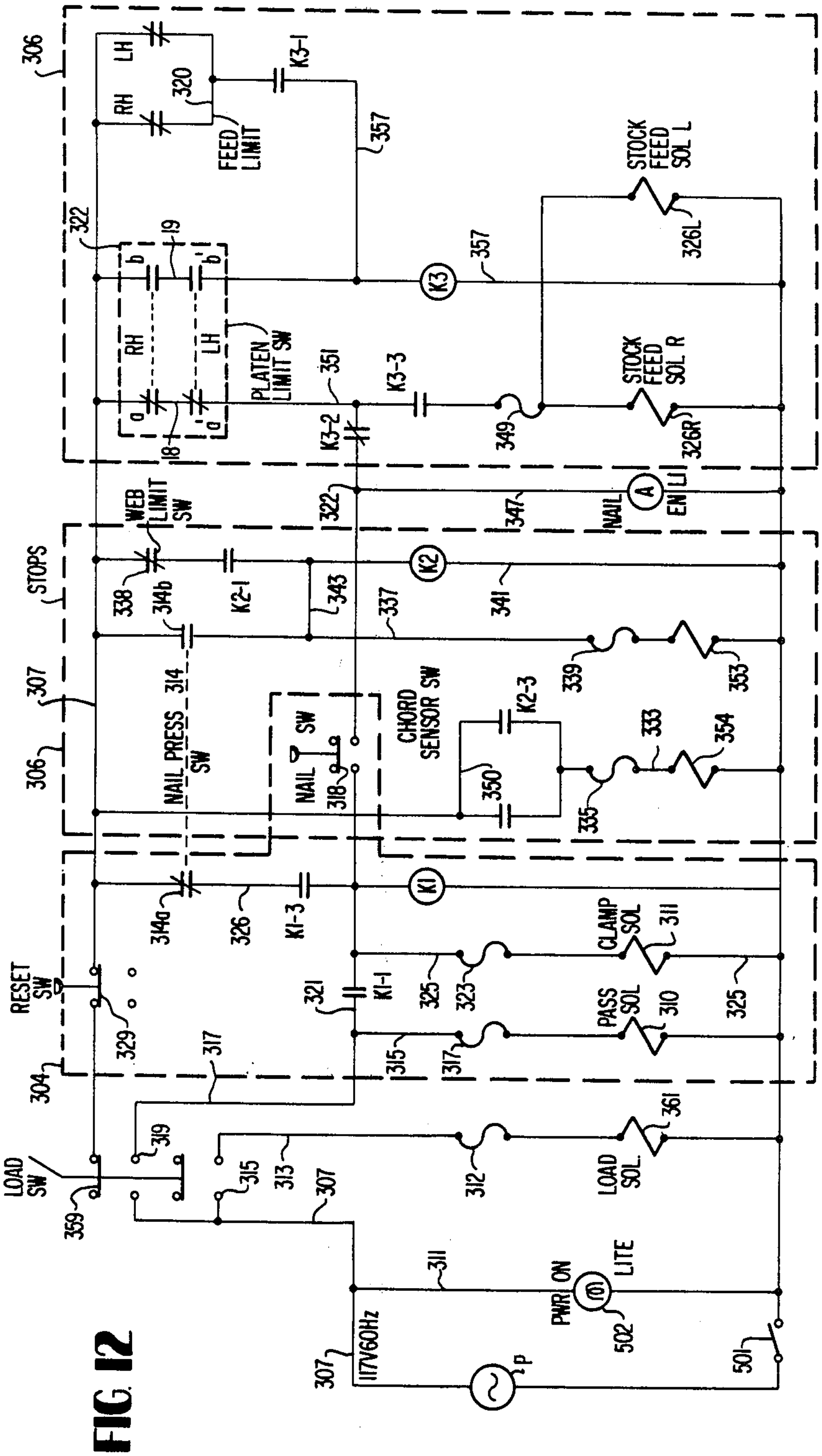

FIGS. 6, 7 and 8 are enlarged fragmentary cross sectional view thereof taken about on lines 6—6, 7—7, and 8—8, respectively, in FIG. 4;

FIG. 9 is a fragmentary enlarged cross sectional view illustrating the manner in which connector stock is cut to form a connector plate;

FIG. 9*a* is an enlarged fragmentary cross sectional view taken about on line 9*a*—9*a* in FIG. 4;

FIG. 9*b* is a plan view of a joint formed by the plate P hereof;

FIG. 10 is a schematic illustration of a pneumatic circuit for use with the fabricating machine hereof;

FIG. 11 is a schematic illustration of a hydraulic circuit for use with the fabricating machine hereof;

FIG. 12 is a schematic illustration of an electrical circuit for use with the fabricating machine hereof;

FIG. 13 is an end elevational view of a reel for use in carrying the connector stock;

FIG. 14 is a side elevational view thereof; and

FIGS. 15*a*–15*e* are is a schematic representations of the manner of fabricating a pallet utilizing the fabricating machine hereof.

Figure 1:
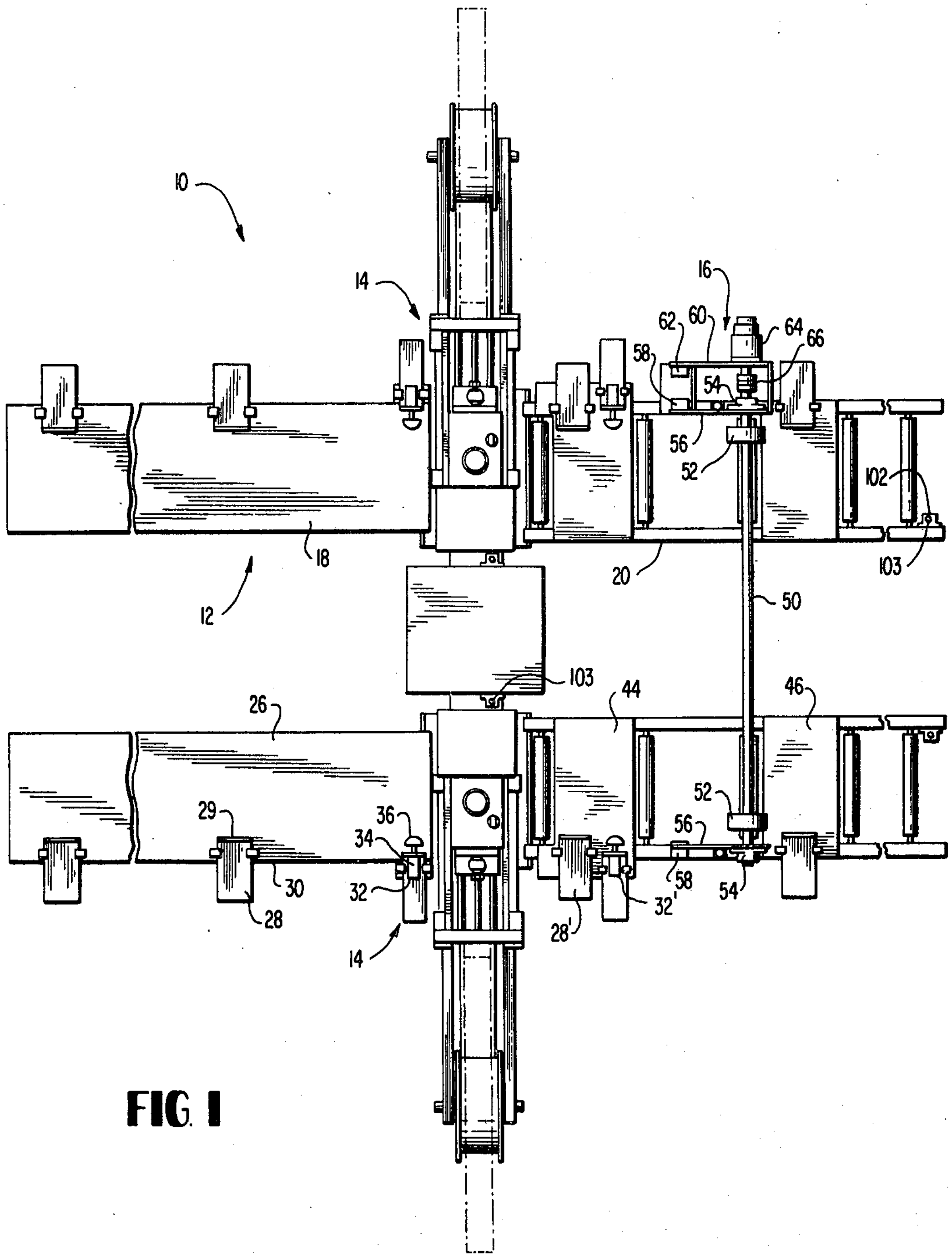
FIG. 1 is a fragmentary plan view of a wooden frame fabricating machine constructed in accordance with the present invention.
Figure 3:
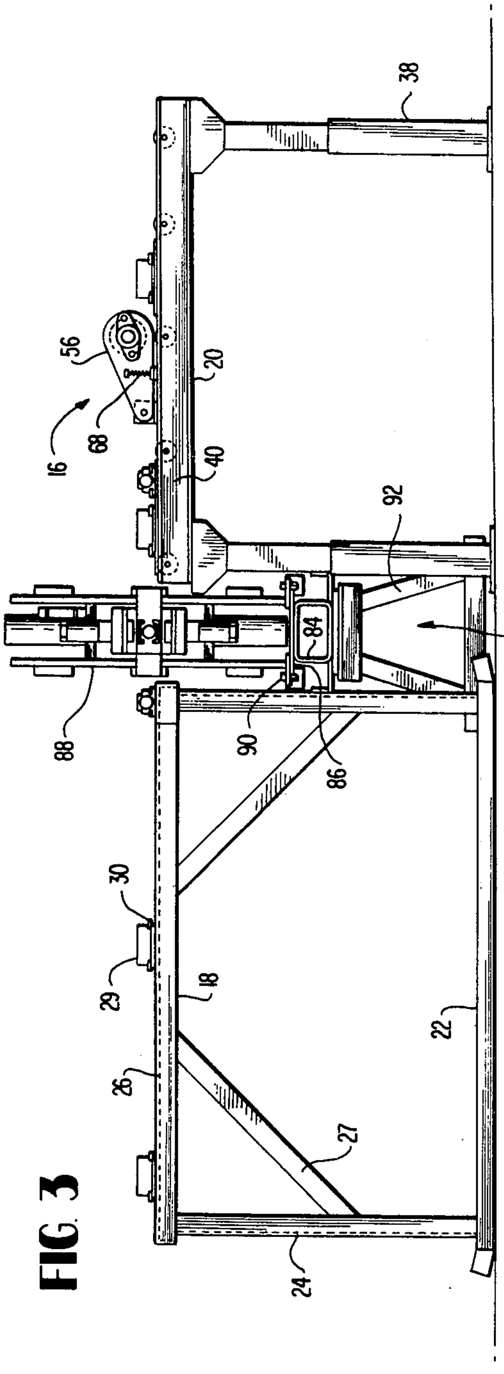
FIGS. 2 and 3 are end and side elevational views thereof respectively.
Figure 2:
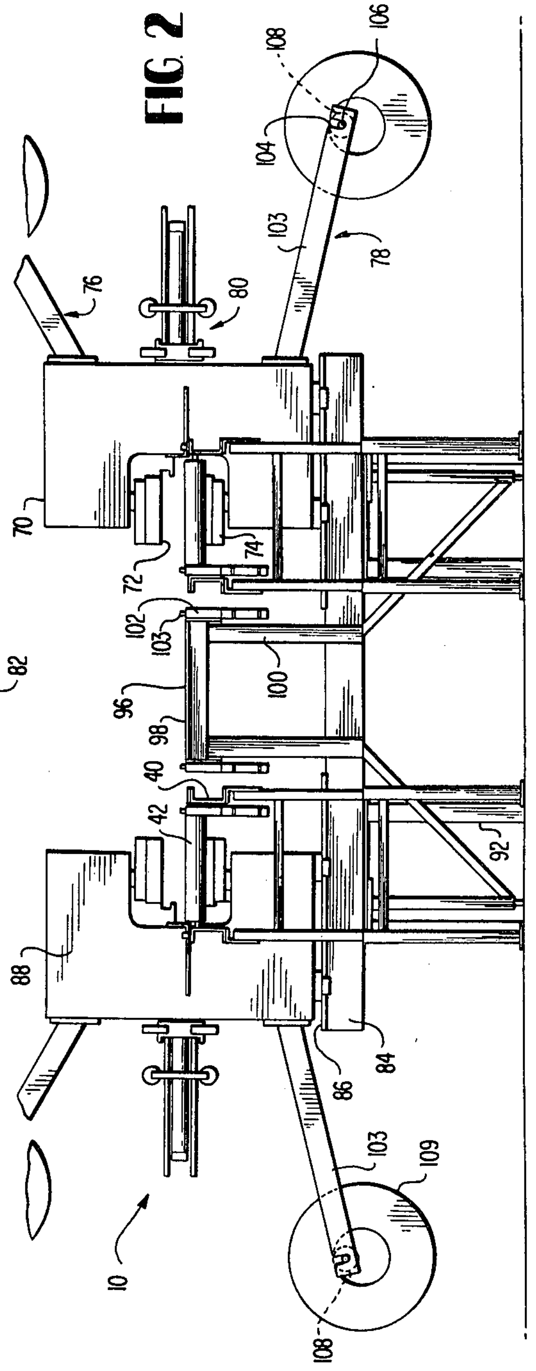

Referring now to the drawings, particularly FIGS. 1–3, there is illustrated a wooden frame fabricating machine constructed in accordance with the present invention and generally indicated 10. Machine 10 generally includes a conveyor 12, a pair of press assemblies 14 on opposite sides of conveyor 12, and a power roller assembly 16 for moving partially completed frames along conveyor 12. With the exception of various elements of power roller assembly 16, the fabricating machine hereof is symmetrical on opposite sides of the centerline of the conveyor and it will be appreciated that a description of the various assemblages on one side of the conveyor centerline is also a description of the like assemblages on the other side of the conveyor centerline.

Conveyor 12 includes a pair each of table and roller conveyor sections 18 and 20 respectively on opposite sides of press assemblies 14, each pair of sections 18 and 20 being symmetrical on opposite sides of the conveyor centerline. Table sections 18 are located on the wooden material input side of the press assemblies 14 and each includes an elongated support base 22 having upstanding supports 24 at opposite ends and a table 26 carried by supports 24. Diagonal braces 27 are provided by supports 24 and table 26. A pair of lumber guide angles 28 are mounted along the outside edges of each of tables 18, the upstanding angles 29 facing inwardly toward the conveyor centerline. Guide angles 28 are secured to tables 18 by releasable clamps 30 whereby angles 28 are movable in a transverse direction to vary the spacing between transversely opposed angles in accordance with the width of the wooden frame being fabricated. Mounted at the ends of tables 18 adjacent press assemblies 14 are pneumatically actuated lumber clamps 32 each comprised of an air actuated spring return cylinder 34 and a clamp head 36. The lumber clamps 32 are similarly adjustably mounted on tables 18 for movement in a transverse direction whereby they can be positioned in accordance with the width of the frame undergoing fabrication.

Each roller conveyor section 20 on the output side of press assemblies 14 includes pairs of upright conveyor supports 38 at its opposite ends mounting at their upper ends transversely spaced rails 40. Rollers 42 are mounted between rails 40 at spaced longitudinal positions therealong. A pair of plates 44 and 46 overlie each roller section 20 at spaced longitudinal positions and each plate carries an adjustable lumber guide angle 28' similar to the previously described angles 28. Plates 44 in addition, mount lumber clamps 32' directly adjacent press assemblies 14, clamps 32' being identical to the previously described lumber clamps 32.

Power roller assembly 16 includes a transversely extending shaft 50 which overlies roller conveyor sections 20 and mounts a pair of cushion rolls 52 for engagement with the upper faces of the lumber carried by roller conveyor sections 20. Opposite ends of shaft 50 are mounted in suitable bearings 54 carried on pressure arms 56 located on the outboard sides of conveyor sections 20. The opposite ends of each pressure arm 56 is pivotally secured to a bracket 58 mounted on roller conveyor section 20. On one side of the conveyor, a second pressure arm 60 is pivotally mounted to a bracket 62 also mounted on roller conveyor section 20 for pivotable movement about a like axis as pressure arm 56. Pressure arm 60 carries a hydraulic motor 64, the output shaft of which is coupled to the shaft 50 by means of a keyed flexible coupling 66. A spring 68 is secured between each roller conveyor section 20 and the pressure arm carried thereby. Rollers 52 are thus biased in a downward direction for engagement along the lumber disposed on roller conveyor 20.

As noted previously, press assemblies 14 are located between each longitudinally aligned pair of table and roller conveyor sections 18 and 20 respectively. Each press assembly 14 comprises generally a C-frame 70 carrying upper and lower press platens 72 and 74, upper and lower supports 76 and 78 for the reels carrying coiled elongated sheet metal connector strips (hereinafter sometimes referred to as stock S), a feed assembly generally indicated 80 (See FIG. 4) and a stock cutting assembly 82 (See FIG. 4). Each C-frame 70 is mounted for movement toward and away from one another whereby wooden frames having various selected widths can be fabricated by the machine hereof. Particularly, C-frames 70 are each mounted on a support assembly generally indicated 82 comprised of a transversely extending rectangular structural tubing 84 mounting plates 86 along its top surface at its opposite ends. Tubing 84 is supported by a base comprised of vertically inclined uprights 92. Each C-frame 70 comprises a pair of longitudinally spaced C-frame plates 88, the lower ends of which mount clamps 90 which releasably clamp about the opposite edges of support plates 86. Thus, the C-frames 70 are mounted for adjustable sliding movement toward and away from one another.

For reasons which will become clear, a center support assembly 96 is carried by the central portion of tubing 84. Particularly, the center support assembly includes a table 98 located transversely between the C-frames 70 and at an elevation corresponding to the elevation of conveyor sections 18 and 20. Table 98 is supported by uprights 100 secured at their lower ends to tubing 84. Table 98 carries on opposite sides thereof air cylinder actuated web stop assemblies 102 including pop-up shafts 103 for reasons which will become apparent from the ensuing description. Conveyor sections 20 also carry along their inboard sides the same kind of air cylinder actuated web stop assemblies and also shown in the drawings as assemblies 102 including pop-up shafts 103.

The reel supports comprise a pair of transversely spaced arms 105 secured at one end to the outer edges of C-frame plates 88 and have slots 104 at their opposite ends for receiving outwardly projecting pins 106 carried by reel arbors 108. The reels include a hub 109 and side plates 110, the hub 109 having a larger diameter than arbors 108. In this manner, the reel is offset downwardly with its center of gravity below its axis of rotation to provide a pendulum effect thereby preventing any tendency of the stock when its free end is fixed to rotate the reel and become unwound.

Referring now to FIG. 4, the coiled connectorstock S is fed from the upper and lower reels by the feed assembly 80 and toward the press platens 72 and 74. The feed assembly 80 is carried by a guide plate 118 which is secured to the C-frame plates 88 directly by screws, not shown with suitable spacers therebetween. The feed assembly 80 is also supported by slide rods 114 carried on the outer sides of plates 88. The rods 114 extend from opposite sides of guide plate 118 through bearings 119 on the outer sides of the C-frame plates 88. Thus, feed assembly 80 can be unscrewed from the C-frame plates 88 and retracted along bearings 119 and remain supported by rods 114 whereby total disconnection of the feed assembly from the press assembly, for example to obtain access to its various parts, is not necessary. Guide 118, as best illustrated in FIG. 5, is slotted along its upper and lower sides to receive the flanges of upper and lower channel shaped stock guide tables 120 and 122, respectively. Stock guide tables 120 and 122 extend toward the peripheries of the upper and lower stock reels and straddle, on upper and lower sides, a stock feed cylinder 124 which is threadedly connected at its forward end in guide 118. Feed cylinder 124 carries a piston shaft 126 which is connected at its forward end to a stock clamp and feed assembly generally indicated 128. Referring particularly to FIG. 4, a pair of brackets 130 are mounted on opposite sides of stock guide tables 120 and 122 and are slotted at their opposite ends at 132. Upper and lower entrance guide rollers 134 and 136 are disposed between the opposed ends of brackets 130 and pins 138 carrying rollers 134 and 136 are received in the slots 132. Springs 140 are coupled between pins 138 whereby rollers 134 and 136 are biased in a direction towards their respective tables to maintain the stock between the rollers and the tables.

Referring to FIG. 6, channel-shaped guide plates 142 and 144 are connected to the upper and lower sides of guide 118 whereby guide plates 142 and 144 form upper and lower passages 146 and 148 for receiving the stock enroute to the press platens. Each channel-shaped stock guide plate 142 and 144 has a transversely extending bore 150 through one side thereof and through which is received a pilot pin 152. The outer end of each pilot pin 152 is carried by a cylinder plate 154 which, in turn, is mounted on the piston shaft of a pilot cylinder 156. The pilot cylinder 156 is secured to the respective stock guides by cylinder brackets 158. Accordingly, it will be appreciated that extension and retraction of the pistons within the pilot cylinders 156 causes the pilot pins 152 to retract and extend into the respective guide spaces 146 and 148 for purposes as will become apparent from the ensuing description.

Referring now particularly to FIGS. 4 and 7, the feed clamp assembly 128 includes a slide block 160 mounted on a pair of slide rods 162 for sliding movement between the full and dash lines position illustrated in FIG. 4. The rods 162 are secured at one end to guide 118. Slide block 160 is recessed along its upper and lower sides as indicated at 164 and 166 respectively and upper and lower jaws 168 and 170 are secured to slide block 160 on its opposite sides within the respective recesses 164 and 166. The upper and lower surfaces of jaws 168 and 170 respectively are grooved in a longitudinal direction to form transversely spaced tines indicated 172 and 174, respectively. That is to say, such surfaces form a longitudinally extending comb-like surface which receive the teeth of the connector stock as it is fed forwardly to the press platens. In this manner, the connector stock is maintained in a predetermined lateral location. Mounted on opposite sides of slide 160 are upper and lower cylinder brackets 176 and 178 respectively. Each bracket is counterbored to threadedly receive the ends of upper and lower clamping cylinders 180 and 182 respectively. Cylinders 180 and 182 mount grippers 184 and 186 respectively on the ends of their respective piston shafts. It will be appreciated that extension of the grippers toward the opposite jaws clamps the connector stock between the tines of the jaws and the grippers. As illustrated in FIG. 4, the entrance ends of jaws 168 and 170 are flared to facilitate entry of the stock through the clamp assembly 128. The forward end of slide block 160 carries an alignment block 184 which is stepped at its forward end for alignment between the spaced upper and lower cutoff blade mounting blocks 186 and 188 respectively which form part of the press assembly.

Referring to FIGS. 4 and 8, blocks 186 and 188 are mounted between C-frame plates 88 and mount upper and lower plates 190 and 192 respectively, which in turn, mount the fixed upper and lower cutting blades 194 and 196. Plates 190 and 192 are suitably secured on opposite sides to the under and upper sides of the upper and lower mounting blocks 186 and 188 respectively and are spaced therefrom to define respective upper and lower stock passages 198 and 200. Plates 190 and 192 as well as mounting blocks 186 and 188 are enlarged adjacent the entrance apertures to passages 198 and 200 to facilitate entry of the stock. Cutting blades 194 and 196 are each provided with a plurality of transversely spaced tines indicated 201 defining grooves 202 therebetween for receiving the teeth of the stock. That is to say, the blade 194 carries upwardly directed tines for receiving the downwardly directed teeth of the stock passing through passage 198, the plate portion of the stock passing between the edges of tines 201 and the lower face of block 186. Likewise, the tines 201 of the fixed lower blade 196 project downwardly whereby the grooves 202 receive the upwardly projecting teeth of stock passing through passage 200 between plate 192 and mounting block 188, the plate portion of the stock being received between the edges of tines 201 and the upper face of block 188. The forward edges of tines 201 on each of the fixed lower and upper blades 194 and 196 form cutting edges whereby discrete upper and lower plates may be sheared from the stock by the press platens in a manner to be discussed. That is, the edges of the comb-like tines 201 on the fixed cutting blades form fixed reaction surfaces for cooperation with movable cutting blades whereby connector plates are cut from the stock S.

Referring to FIGS. 5 and 8, the upper block 186 on each press assembly carries an air actuated chord stop cylinder (FIG. 4)a. The piston shaft 199 is extensible into and retractable from the space defined between upper and lower plates 190 and 192 whereby, when extended, shaft 199 serves as a stop for locating each chord of the frame. Note that shafts 199 and 103 of the web stop assemblies lie in transverse alignment one with the other.

Upper and lower press cylinder plates 210 and 212 respectively extend between the C-frame plates 88 and mount upper and lower press cylinders 214 and 216 respectively. Cylinders 214 and 216 are threaded into bearing plates and the piston shafts respectively carry the upper and lower press platens 72 and 74. Platens 72 and 74 carry respective cutting blades 118 and 220 for cooperation with the fixed upper and lower blades 194 and 196 to shear the connector strips S to the selected lengths for use in the frame being fabricated. It will be appreciated that simultaneous extension of the pistons of the press cylinders 214 and 216 moves the platens 72 and 74 toward one another whereby the ends of the stock are cut by the moving and fixed blades with the cut connector plates being carried by the platens for embedding the teeth thereof into the opposite sides of the frame parts between the press heads in a manner to be described.

For maintaining accurate plate location after they have been cut from the strips, the cutting blades 218 and 220 of the upper and lower press platens each have a dovetail groove 211 centrally along its cutting edge and rear face, i.e., the face thereof in opposition to the corresponding fixed blade 194 or 196. The fixed blades 194 and 196 each carry an outwardly projecting dovetail shaped tongue 213 along its cutting edge and forward face for registration with the corresponding dovetail groove 211. Accordingly, when the press platens move toward one another, the grooves 211 and tongues 213 cooperate to cut a dovetail shaped groove 217 (FIG. 9B) along the rear edge of the plate P which is being cut from the stock, leaving a dovetail projection 219 on the forward edge of the stock. Upon continued movement of the platens towards one another, the plate is constrained from movement by the engagement of its dovetail groove along the corresponding tongue 213 carried by the fixed blade. A magnet 223 is provided in the upper platen to prevent the cut plate from bending away from the platen. The plate is held by the dovetail projection 213 until the shearing action is complete and until just prior to initial penetration of its teeth into the joint. The plate is held by magnet 223 throughout the cutting and embedment operations. This ensures that the plate does not move from its intended location in the joint after being cut and prior to full embedment. The platens alternatively may be provided with spring biased plungers which straddle each plate on its opposite sides.

Referring to FIG. 10, there is illustrated a schematic diagram of a pneumatic circuit for the feed, stop, and clamp assemblies. The pneumatic circuitry is identical for each press assembly including the clamping and pilot cylinders as well as the lumber stops and clamps on opposite sides of the conveyor centerline. The pneumatic circuit for each press assembly and the clamps and stops associated therewith are illustrated within the dash lines. As illustrated, there is provided an air source 253 connected in parallel via a conduit 255 with five four-way, five-port, two-position solenoid actuated spring return valves 254l, 256, 258, 254R and 300. For brevity of description, the left and right hand circuit elements corresponding to the left and right hand press assemblies and the clamps and stops associated therewith are identified with reference numerals having letter suffixes L and R respectively. Valves 254L and 254R serve to provide air to the left and right pilot, stock clamp, and feed cylinders 156; 180; 182; and 124 respectively on opposite sides of the machine. Valve. 256 provides air to web stops 102. Valve 258 provides air to chord stops 197 and valve 300 provides air to the lumber clamp cylinders 34. As illustrated, valves 254L and 254R are spring biased into the illustrated position wherein air is delivered to pilot cylinders 156 via conduits 259, 260,265, 262 and 264 to maintain the pilot cylinders in a retracted position with the pilot pins engaged between the teeth of the stock. Conduits 260 and 274 flow through a four-way two-position solenoid actuated spring returned valve 265 for purposes described hereinafter. Valves 254L and 254R also communicate air via lines 266, 268, 270 and 272 to the clamping cylinders 180 and 182 to maintain the latter in a retracted position. Air is also provided via flow control valve 271 and a time delay valve 273 to feed cylinder 124 to maintain it in a retracted position. It will be appreciated that the opposite sides of the various cylinders are exhausted to a reservoir via conduits which will now be described in connection with the actuation of the various cylinders.

Upon energization of the stock feed solenoids 326L and 326R associated with valves 254L and 254R respectively, the valves are shifted to provide air via conduits 275, 274, 276, and 278 to extend the pilot cylinders 156 whereby the pilot. pins 152 are retracted from between the teeth of the stock. Air is also provided upper and lower clamping cylinders 180 and 182 respectively via conduits 280, 282 and 284 to extend grippers 184 and 186 whereby the upper and lower stock is clamped between the grippers and the jaws 168 and 170 respectively. Air is also provided feed cylinder 124 via conduit 280, flow control valve 286, and a time delay valve 288 to extend its piston whereby clamping assembly 128 and the stock clamped thereto is advanced. The opposite sides of the various pilot, clamp and feed cylinders communicate with a reservoir via the previously described conduits 268, 270, 266, 262, 264, 260 and 259 when the solenoids 326 are energized.

In the rest position, valve 256 provides air to web stops 102 via conduits 290 and 292 whereby the stops are maintained in an extended position. Upon energization of the web stop solenoid 353, valve 256 shifts to provide air via conduits 294 and 295 to the opposite sides of stop cylinders 102 whereby pop-up shafts 103 are retracted. Valve 258 is illustrated in a position providing air to the chord stop cylinders 197 via conduits 296 and 297. When the chord stop solenoid 354 associated with valve 258 is energized, valve 258 shifts to provide air via conduits 298 and 299 to the opposite ends of cylinders 197 to retract the stops 199.

Valve 300 is connected via a conduit 301 with the air supply. In the illustrated position, valve 300 supplies air to exhaust ports, which are plugged. Cylinders 34 and 34' are spring biased to maintain their clamp heads in a retracted position. Upon energization of the solenoid 311 associated with valve 300, the latter shifts to supply air via conduit 302 to each set of cylinders 34 and 34' to extend the heads 36, 36' against the side chords and clamp the latter against the web ends. Upon de-energization of solenoid 311, the spring returns the valve to the illustrated position with air being supplied to the plugged exhaust ports. The clamp heads then spring back to their retracted position.

Referring to FIG. 11, there is illustrated a hydraulic circuit for the press cylinders 214 and 216 on each of the press assemblies. A variable displacement pump 230 supplies fluid from a reservoir 232 via a conduit 234 and through a directional control valve 236 to one side of the press cylinders 214 and 216 to maintain the press platens in a retracted position. Particularly, conduit 234 connects with a conduit 238 connected in parallel with the press cylinders on opposite sides of the machine via conduit 240 and 242. The opposite side of the press cylinders are connected via conduits 241, 243 with a flow divider 244 via relief valves 245 in each of lines 241 and 243. A conduit 246 communicates between the flow divider 244 and a reservoir 232 via valve 236. A pressure actuated switch 314 lies in comminucation with conduit 246.

Motor 64 is connected between the reservoir 232 and pump 230 via a conduit 248, motor 64 running continuously and stalling when the chords butt the web stops 107. In operation, hydraulic fluid is provided upper and lower press cylinders 214 and 216 by pump 230 and conduits 238, 240 and 242. Upon energization of solenoid 310 associated with valve 236, the latter valve shifts to supply fluid to the flow divider 244 and to the press cylinders 214 and 216 via conduits 243 and 241 to extend the press platens carried thereby. Flow divider 244 serves to equalize the pressure of the fluid supplied the press cylinders to ensure uniform pressing action. Fluid flow returns to reservoir 232 from the opposite sides of cylinders 214 and 216 via conduits 240, 242, 238 and 247. Upon completion of the pressing action, the solenoid 310 is de-energized whereupon valve 236 is spring returned to the illustrated position. Fluid again flows to the press cylinders 214 and 216 via conduits 238, 240 and 242 to retract the platens and maintain them in a retracted position.

Referring now to FIG. 12 which is a schematic representation of an electrical control circuit for the fabricating machine hereof, the circuit is divided into several parts by dashed lines which indicate the functions of the circuitry enclosed by the dashed lines. The circuit is illustrated in a detached contact mode wherein the various relays represented by circles open and close associated contacts in a manner to be described, normally open and closed contacts being denoted by the pairs of parallel lines and the slashed pairs of parallel lines, respectively except where such notation is designated a switch. The contacts have numeral suffixes corresponding to the numeral suffixes of their actuating relay, the second numeral suffix indicating a particular contact. As noted previously, the electrical circuit has been divided by the dashed lines according to the various functions performed by the components thereof; the circuitry components within the dashed line indicated 304 controlling the pressing operation including the lumber clamps, the components within the dashed line indicated 305 controlling the feeding of the stock to the press assembly including the feed clamps therefor; and the components within the dashed line indicated 306 controlling the chord and web stops.

117 volts 60 cycle current is provided across lines 307 and 309 by a suitable power source P and which power source also provides power for hydraulic pump 230. Connected across the power source in line 311 is a power-on light 502, which indicated that the unit is energized. In line 309, there is provided a start switch 501. Connected in series across the power supply by a line 313 is a load solenoid 361, a fuse 312 and normally open contacts 319a which form part of a load switch 359. Connected in series by a line 315 is a press solenoid 310 and a fuse 317, line 315 connecting these elements across the power supply via normally open contacts 319 which form another part of the load switch 359. Connected in parallel with press solenoid 310 is normally open contacts K1-1 in lead line 321 and a clamp solenoid 311 and a platens 323 are connected in series by line 325. Connected in series across the power supply by lines 326 and 327 are the normally closed contacts 314a of a nail pressure switch 314, a normally open contacts K1-3 and a relay K1, line 321 connecting with line 327 between relay K1 and contact K1-3. Between lead lines 326 and load switch 359 there is provided a reset switch 329. A chord sensor switch 350 and normally open contacts. K2-3 are connected in parallel across the power supply by lines 331 and 333, a fuse 335 and the chord stop solenoid 354 being connected in series in lead line 333. Also connected in series across the power supply by a line 337 is the normally open contacts 314b of nail pressure switch 314, a fuse 339 and a web stop solenoid 353. Contacts 314a and 314b are mechanicaly linked whereby the closing of one set of contacts opens the other set. Line 341 connects relay K2, normally open contacts K2-1, and a normally closed web limit switch 338 across the power supply. Line 343 connects with line 337 between normally open contacts 314b and fuse 339 and with line 341 between relay K2 and contacts K2-1. A normally open nailing switch 318 is disposed in line 321 and a nail enabling light 503 is connected by line 347 between lines 321 ad 309. Connected in series across the power supply by line 351 are contacts 322a and 322a' of the right and left hand platen limit switch 322, normally open contacts K3-3, a fuse 349 and the left and right hand stock feed solenoids 326L and 426R which are connected in parallel one with the other contacts 322*a* and 322*a'* being closed only when the platers are in their retractable position. A line 355 connects with line 351 between contact K3-3 and platen limit switch 322, line 355 being connected to line 321 between the nail-switch 318 and light 503. Line 357 connects across the power supply relay K3, and normally open contacts 322*b* and 322*b*' of the platen limit switch, the contacts 322*a* and 322*a*' being mechanically connected to contacts 322*b* and 322*b*' respectively. Connected in parallel across the platen limit switch 322 is normally open contacts K3-1 and a feed limit switch 320 having normally closed parallel connected contact sets.

The power-on light 502 indicates that power is available to the circuit. In operation, the start switch 501 is closed to provide power across lines 307 and 309. In this rest condition of the circuit with the power applied across lines 307 and 309, it will be appreciated that relays K1, K2 and K3, load solenoid 361, press solenoid 310, clamp solenoid 311, chord and web stop solenoids 354 and 353, respectively, and the left and right hand stock feed solenoids are de-energized. The nail enabling light 503 is lighted by power supplied across lines 351, 355, and 347. To operate the nailing circuit, the nail switch 318 is momentarily depressed to energize relay K1 through lines 351, 355, 321 and 327. Energization of relay K1 closes normally open contact K1-3 to complete a holding circuit for relay K1 through line 326 and 327 and normally closed contacts 314*a*. Energization of relay K1 also closes normally open contacts K1-1 whereby press solenoid 310 is energized through lines 321 and 315 and clamp solenoid 311 is energized through lines 321 and 325. At the completion of the pressing operation, the pressure actuated switch 314 opens normally closed contacts 314*a* to de-energizwe the holding circuit for relay K1 which, upon de-energization, returns contacts K1-1 and K1-3 to their normally open positions, Opening contact K1-3 de-energizes the press and clamp solenoids 310 and 311, respectively, whereupon the platens are returned to their normal positions and the frame is released in a manner to be described.

When the hydraulic pressure builds up in the press cylinders, normally open contacts 314*b* of nail pressure switch 314 close to energize relay K2 through lines 343 and 341 and to energize web stop solenoid 353 through line 337. Energization of relay K-2 closes normally open contacts K2-3 and K2-1. Closing contacts K2-1 completes a holding circuit for relay K2 through normally closed web limit switch 338 and line 341. Closing contact K2-3 energizes chord stop solenoid 354. Thus, by energizing the chord and web stop solenoids 354 and 353 respectively, all stops are retracted. Upon advancement of a partially completed frame through the machine as hereafter more particularly described, the web limit switch 338 is opened de-energizing relay K2 which returns conta: K2-1 and K2-3 to their normally open positions and thereby de-energizing solenoids 353 and 354 allowing the stops to extend. However, if a chord of the partially completed frame is sensed by chord sensor switch 350, switch 350 closes to maintain chord stop solenoid 354 energized through line 331 and 333 whereby the chord stop is maintained retracted.

It will be recalled that, upon movement of the press platens toward one another, the normally open platen contacts 322*b* and 322*b*' close energizing relay K3 which in turn closes normally open contacts K3-1 and K3-3 and opens normally closed contact K3-2. Opening normally closed contact K3-2 de-energizes the nail enabling light 503 and also turns off or disables the nailing command circuit which includes all relays, contacts, solenoids and switches actuated as a result of closing the nail switch 318. Closing normally open contact K3-1 completes a holding circuit for relay K3 through line 357 and the normally closed feed limit switch 320. Closing contacts K3-3, however, does not complete the circuit to the stock feed solenoids 326R and 326L as contacts 322*a* and 322*a*' of the platen limit switch are held open until the platens return to their retracted positions. Upon their return, contacts 322*a* and 322*a*' return to their closed position thereby energizing the stock feed solenoids 326R and 326L through line 351. At the end of the stock feed stroke, the normally closed contacts 320 of the feed limit switch open to de-energize relay K3. De-energization of relay K3 returns contacts K3-1 and K3-3 to their normally open positions whereupon the stock feed solenoids 326R and 326L are de-energized and returns contacts K3-2 to their normally closed positions energizing the nail enable light and this in turn powers or enables the nail command circuit.

Referring now to FIG. 13, there is illustrated an empty reel on which the stock can be coiled. Each reel includes a hub 109 and a pair of spaced side plates 110 for confining the stock. A releasably mounted pin 400 extends transversely between side plates 110 at a location on the reel closely adjacent hub 109. Prepunched stock can be fed from a die directly to the reel and wound thereabout by rotating the reel at a speed proportional to the advance of the stock from the die, the drive means for rotating the reel not being shown. Particularly, the stock is fed between the hub 109 and pin 400 with the teeth 402 of the stock projecting radially outwardly to engage the pin upon rotation of the reel to wind the stock thereabout. After winding the stock on the reel, it is cut and secured ready for shipment and/or use with the machine hereof. The pin 400 is removed after the reel is mounted on the machine whereby the entire stock can be unwound from the coil and fed to the machine.

As an example of the foregoing, a 1.5 inch width of 20 U.S. Standard Gauge stock can be coiled in lengths of about 152 feet and weigh about 30 pounds whereby the coils of stock can be loaded into the machine manually.

OPERATION

To operate the machine, the start switch 501 is closed to provide power to the electrical circuits illustrated in FIG. 12 within the dashed boxes 304, 305 and 306, the light 502 indicating that power is available. When these circuits are energized, the machine is at rest with the stock feed cylinder 124 retracted, the pilot cylinders 156 retracted with the pilot pins in the passages 146 and 148, the upper and lower clamp cylinders 180 and 182 retracted and the nail enable light lit. At rest, relays K1, K2 and K3 are de-energized and normally open contact K3-3 maintains stock feed solenoids 326L and 326R de-energized and the valves 254L and 254R respectively associated therewith in the position illustrated in FIG. 10. Hydraulic valve 236 lies in the illustrated position in FIG. 11 and the lumber clamps are retracted since normally open contact K1-1 and nail switch 318 prevent solenoids 310 and 311 from being energized. The web stop solenoid 353 is maintained de-energized through normally open contacts K2-1 and 314*b* and valve 256 supplies air to web stop cylinders 102 whereby pop-up shafts 103 are maintained extending into the path of movement of the webs. However, without lumber on the machine, sensor switch 350 senses the lack of a chord on conveyor section 18, and thus remains open maintaining chord stop solenoid 354 in a de-energized condition and the chord steps 199 extended. The machine is now ready for loading.

The arbors 108 are placed within reel hubs 109 and the reels containing the coiled connector stock are placed on the upper and lower support brackets 76 and 78 on opposite sides of the machine with the pins 106 in slots 104. The reels are thus mounted for rotation but achieve a pendulum effect which prevents the reels from rotating of their own accord once the stock is fed to the machine. Load switch 359 is rotated to close contacts 315 thereby energizing solenoid 361. Energization of solenoid 361 shifts valve 265 to the left in FIG. 10 whereby air is provided cylinders 156 to extend the pistons and withdraw the pilot pins from passages 146 and 148. Rotation of load switch 359 also closes contacts 319 thereby energizing the press solenoid 310. Energization of solenoid 310 causes the press platens to move toward one another into a fully extended position blocking the ends of passages 198 and 200. Note that open contacts K1-1 prevent the nail pressure switch from causing the platens to return. The coiled stock from the upper reel is then fed between table 120, roller 134, through passage 146 in guide 118, through the comb-like tines 172 of the jaw 168 in clamp assembly 128, through passage 198 in the press head and through the tines of the fixed cutting edge 194 into abutment against the press platen 72. Likewise, the coiled stock from the lower reel is fed between the lower table 122, roller 136 through passage 148, through the tines 174 of lower jaw 170, through passage 200, through the tines of the lower fixed cutting blade 196 and into abutment against the lower platen 74. Load switch 359 is then rotated to de-energize solenoid 361 which returns valve 265 to the position illustrated in FIG. 10 thereby returning the pilot cylinders to their retracted positions. Also, upon movement of the press platens, contacts **322*b* and 322*b'* close to energize relay K3 which closes contacts K3-3 but which does not energize the stock feed solenoids since contacts 322*a'* are open. Return of the platens closes contacts 322*a* and 322*a'* to energize the stock feed solenoids 326R and 326L through line 351 and the closed contact K3-3. Upon energization of the stock feed solenoids, the pilot cylinders 156 extend to withdraw pins 152 from passages 146 and 148, the cylinders 180 and 182 extend to clamp against the stock and the feed cylinder 124 advances the stock a predetermined distance between the press platens. While the feed assembly as illustrated provides for maximum feed, it will be appreciated that sleeves of predetermined length can be disposed on the rods 162 whereby the stroke of the feed assembly can be limited to a predetermined length as desired. Thus, selected lengths of connector plates can be cut in a manner to be set forth from the stock fed into the machine. At the end of the feed stroke, feed limit switch 320 opens to de-energise relay K-3 and thereby return contact K3-3 to its normally open position whereupon the feed solenoids are de-energized. Upon spring return of valves 254R and 254L, the pilot cylinders retract to insert pins 152 between the teeth of the stock, the clamp cylinders retract, and the feed cylinder retracts after a time delay. Particularly, the pins 152** are inserted between a pair of transverse rows of teeth to adjust the longitudinal position of the stock in the press and also to hold the stock during shearing. Also, the pilot pins longitudinally adjust the location of the connector stock such that the teeth thereof are not aligned at the cutting blades. This prevents attempted shearing of the plate at the location of its teeth. If this was not prevented, the teeth per se might be sheared rendering them ineffective (as they would buckle upon attempted embedment in the wooden members). Also, the teeth might not shear at all as there is no reaction surface underlying the teeth for the movable cutting blade to act against due to the tines carried by the fixed cutting blade. The tines are, of course, necessary to guide the stock. Thus, the pilot pins ensure that the cut through the stock is made at a location between the teeth and only through the plate portion of the stock and not its teeth. The machine is now ready for a pressing operation.

Figure 15:
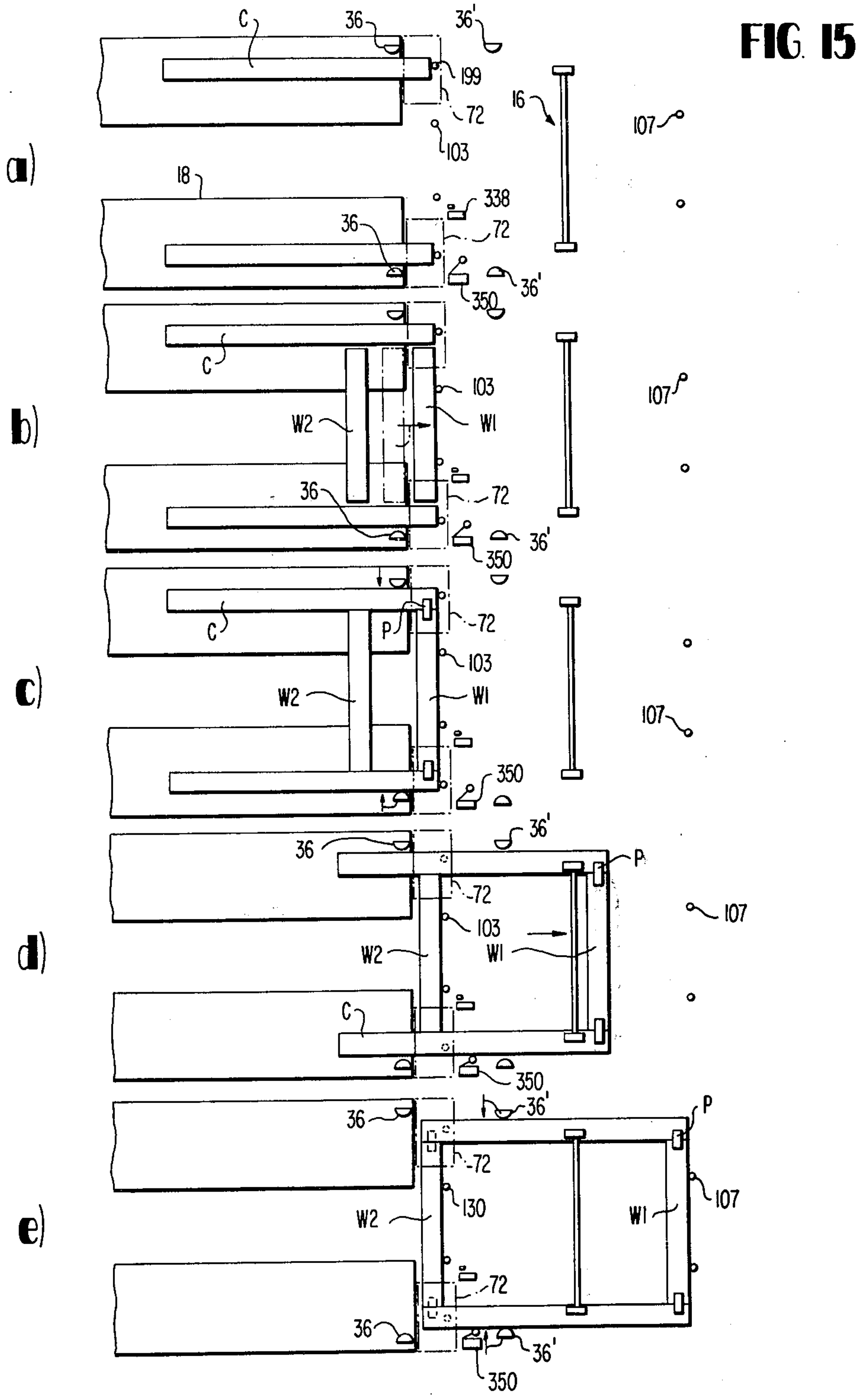

With reference to FIG. 15, a pair of precut chords C are disposed on table conveyor sections 18. The chords are then moved longitudinally along conveyor sections 18 into abutment with chord stops 199 as illustrated in FIG. **15*a*. A pair of precut web members W1 and W2 are then disposed between chords C on conveyor table section 18 and the first web W1 is manually moved forwardly into abutment against raised web stops 103. The second web W2 is spaced behind first web W1 a distance of about one foot (FIG. 15*b*). With the webs and chords thus positioned as in FIG. 15*b*, the operator depresses nail switch 318 to energize relay K1 and clamp solenoid 311, which closes normally open contact K1-3 to provide a holding circuit for relay K1 and clamp solenoid 311, and closes normally open contact K1-1 whereby press solenoid 310 is energized. Energization of clamp solenoid 311 causes valve 300 to shift whereby air is supplied clamp cylinders 32 and 32' to extend clamp heads 36 and 36' carried thereby. Clamp heads 36 and 36' thus engage the outer faces of the chords and press the chords against the ends of web W1. Energization of press solenoid 310 shifts valve 236 to supply hydraulic fluid to upper and lower press cylinders 214 and 126, respectively, via the flow divider 244 whereby press platens 72 and 74** are moved toward one another.

Upon movement of platens 72 and 74 toward one another, the portions of the strip extending beyond the fixed cutting blades 194 and 196 are engaged by the platens and the movement of cutting blades 218 and 220 past blades 194 and 196 sever connector plates P from the stock S as illustrated in FIG. 9. An important feature hereof is the reaction force provided by the tines of the fixed blades whereby the stock is maintained rigid at the location of its cut. The connector plates P thus cut are carried by platens 72 and 74 toward one another and the teeth 402 thereof are embedded into the upper and lower sides of the joint formed by the chords and first web located previously between platens 72 and 74 by stops 199 and 103. See FIG. **15*c*. Upon full embedment of the teeth the hydraulic pressure in the hydraulic circuit builds up and actuates pressure switch 314 to open contacts 314*a*. This de-energizes the holding circuit for relay K1 whereupon contacts K1-1 and K1-3 return to their normally open position de-energizing press solenoid 310 and clamp solenoid 311. Valve 236 thus shifts to supply hydraulic fluid to the press cylinders 214 and 216 to move the platens 72 and 74 away from one another and away from the completed joint. Air valve 300 also shifts to retract lumber clamps 32 and 32'.**

Actuation of pressure switch 314 also closes contacts 314*b* to energize relay K2 and web stop solenoid 353. Energization of relay K2 closes normally open contacts K2-3. K2 is maintained energized by a holding circuit through contacts K2-1. Closing contact K2-3 energizes chord stop solenoid 354. Energization of solenoids 353 and 354 causes valves 256 and 258, respectively, to shift whereby air is supplied to the web stop cylinders 102 and the chord stop cylinders 197 thereby to retract pop-up shafts 103 and 199, respectively carried thereby.

The partially completed frame is then manually advanced (FIG. 15*d*) below power roller 16 which thereafter carries the partially completed frame forwardly. Upon advancement of the partially completed frame, web W1 momentarily opens web limit switch 338 to de-energize the holding circuit for relay K2 whereupon contacts K2-1 are returned to their normally open position de-energizing web stop solenoid 353 and causing web stops 103 and 107 to be extended. In advancing the partial frame, the chords are advanced to engage and close the chord sensor switch 350 causing continued energization of the chord stop solenoid 354 through line 331 and hence continued retraction of stop 199. The partially completed frame continues to advance until web W1 butts extended stops 107. Extended web stops 103 catch and retain the second web in the position illustrated in FIGS. 15*d* and 15*e* whereupon it becomes aligned with the trailing ends of the chords.

After the press platens 72 and 74 are retracted, the retracted platen switch 322 returns contacts 322*a* and 322*a'* to their normally closed position and contacts 322*b* and 322*b'* to their normally open position.

It will be recalled that initially relay K3 was not energized. Upon initial movement of the platens, toward one another, however, contacts 322*b* and 322*b'* close and energize relay K3. Contacts K3-1 hold relay K3 energized through the normally closed contacts of feed complete switch 320. Normally closed contacts K3-2 open upon energizing relay K3 and disconnect the nail switch 318 from the nail feed circuitry and from its source of power, preventing nailing and turning off the nail enable light 503. The normally open contacts K3-3 close upon energizing relay K3 and provide a path from the stock feed solenoids 326R and 326L to the now open platens retracted limit switches 322*a* and 322*a'*. This locks the nail feed circuit so that when the platens retract, and the platen limit switch 322 is in its normal position, nail feed solenoids 326L and 326R are energized through contacts 322*a* and 322*a'* and closed contact K3-3. Consequently, upon return of platen switch 322 to its normal position, the stock feed solenoids 326R and 326L are energized to shift valves 254 to supply air to the pilot cylinders 156 and the upper and lower clamp cylinders 180 and 182. The upper stock is clamped between grippers 186 and jaw 168 while the lower stock is clamped between gripper 184 and jaw 170. It will be noted that the clamping action is only on the surface of the plate and not against the teeth because of the tines in jaws 168 and 170, respectively. Also, the pilot cylinder pistons extend to retract the pilot pins 152 from between the longitudinally adjacent transverse rows of teeth. With the stock clamped and properly located relative to the cutting edges, feed cylinder 124 advances after a slight time delay to advance the stock a distance beyond the fixed cutting edges equal to the distance of the stroke of cylinder 124 (which may be adjusted by inserting one or more sleeves of selected length about rods 162). Upon completion of the feed stroke, normally closed feed limit switch 320 is momentarily opened thereby de-energizing relay K3 and opening normally closed contacts K3-3 and closing normally closed contacts K3-2, whereupon stock feed solenoids 326L and 326R are de-energized. Power is also supplied to nail switch 318 and nail enable light 503. This enables the nail circuit for subsequent nailing. Upon de-energization of solenoids 326R and 326L, valve 254 spring returns to the position illustrated in FIG. 10 whereupon the pilot cylinder pistons retract to insert the pilot pins between the transverse rows of teeth of the advanced stock, the upper and lower clamp cylinders retract to release the stock and the feed cylinder retracts to withdraw the clamp assembly 128 to the dashed line position illustrated within FIG. 4 preparatory for another feed.

It will be appreciated that the pilot pins are inserted prior to retraction of the clamp assembly, that is, retraction of the feed cylinder and hence the upper and lower clamp cylinders. As noted previously, the pilot pins serve to adjust the longitudinal location of the connector stock, as necessary, to avoid alignment of the teeth with the cutting edges. When the clamp assembly releases the stock, the pilot pins thus longitudinally adjust the location of the stock relative to the cutting blades and also hold it in such position until the pins are again retracted after the next cut is made.

Since the partially completed frame is now located in position for applying connector plates to the joint between the second web W2 and the trailing ends of the chord, nail switch 318 is again depressed and the press heads 72 and 74 substantially simultaneously shear connector plates from the connector strip and embed the teeth thereof into the opposite sides of the joint on each side of the frame. Upon retraction of the press platens, the feed mechanism again operates to locate predetermined lengths of connector stock beyond the fixed cutting blades between the press platens and the completed frame is advanced along the conveyor away from the machine by the power roller. Upon removal of the completed frame, the chord sensor switch 350 opens to de-energize solenoid 354 whereupon the chord stops are extended. The machine is thus ready for the fabrication of a second frame. It will be recalled that stops 103 and 107 are returned to their extended positions by the momentary opening of the web limit switch 338 which permits de-energization of the web stop solenoid 353.

From the foregoing description of the present invention it will be appreciated that the objects of the invention are fully accomplished in that there is provided both a novel and unique industrial product in the form of a reel carrying connector stock coiled about the reel, the stock having prepunched integral teeth projecting radially outwardly from one side thereof, as well as a fabricating machine in which the connector stock is fed from the reel for cutting to appropriate lengths to form connector plates and embedment of the plates thus formed into the opposite sides of the wooden joint. The problems encountered by a supplier of connector plates as well as those encountered by the fabricators of frames are minimized or eliminated by the unique methods and apparatus hereof for handling a product of this type. For example, the supplier of the connector stock need only wind the connector stock onto reels as it emerges from die cutting and nail punching machines and ship the reel to the fabricator. This eliminates the handling problems associated with packing the individual connector plates as previously done in the past. Likewise, the fabricator eliminates any handling of individual connector plates as shipped to him by a supplier. That is, the reels can be readily stored when received from the supplier and applied to the machine without individual handling of any one or more of the connector plates.

Moreover, it will be appreciated that the fabricating machine hereof is uniquely compatible with the coiled connector stock. The fabricating machine cuts the stock to the appropriate length as it is fed from the reel and substantially simultaneously embeds the teeth of the connector plates thus formed to the joint formed by the wooden member. Also, the machine provides a substantially automated operation in the formation of a frame in that an operator is required only to feed the appropriate wooden members into the machine and need not concern himself with the spotting and location of the various connector plates as done previously. From the foregoing, it will also be appreciated that connector plates of various lengths can be handled by the machine hereof simply by shortening the stroke of the feed cylinder by the interposition of one or more sleeves on the guide rods. Also, the passages through the machine can handle connector stock of various widths since the stock is laterally guided by the engagement of the stock teeth between the tines. Further, the fabricating machine hereof is adapted to fabricate a wide variety of wooden frames, panels and the like including but not limited to trusses, truss-type floor joists and side framing panels for wooden building construction. Also, the machine is not limited to an orientation of the coiled stock and plates normal to the direction of movement of the frames undergoing fabrication. That is, the machine can be oriented such that the coiled stock is fed in a direction parallel to the direction of movement of the frames undergoing fabrication and may for example be utilized to form splice joints in elongated frame members.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A method for joining transversely spaced generally parallel elongated wooden side members and elongated longitudinally spaced intermediate wooden members disposed between said side members to form a frame thereof by applying a sheet metal connector plate, of the type having integrally struck teeth projecting from one side thereof, to joints formed between the side and intermediate wooden members comprising the steps of:

1. providing first and second coils of connector stock of the type having integrally stuck teeth projecting from one side thereof,
2. feeding the connector stock from the coils to respective first and second pressheads, each presshead being movable along a predetermined path from a retracted to an extended position and each presshead carrying a cutting edge thereby defining relative to the cutting edge a predetermined line of cut along the connector stock,
3. providing a reaction surface cooperable with each cutting edge and comprised of a plurality of tines defining a plurality of laterally spaced recesses;
4. moving each presshead and locating each presshead adjacent a joint between a side member and an intermediate member;
5. guiding the stock from the coils to the presshead so that the teeth move along the recesses as the stock is fed into the path of movement of the pressheads;
6. displacing each presshead to engage the cutting edge and reaction surface tines along opposite sides of the stock and along its predetermined line of cut and, upon continued displacement of the presshead, cutting the stock to form first and second plates of predetermined length,
7. pressing the teeth of the first and second connector plates thus formed into a joint of a side member and an intermediate member,
8. advancing the partially joined frame of side members and intermediate members, and locating another joint between a side member and an intermediate member in the paths of movement of said first and second pressheads and repeating steps (6) and (7).

2. The method according to claim 1 including substantially simultaneously pressing the teeth of the first and second connector plates in opposite sides of the members forming a joint with each presshead providing a reaction force for the other.

3. The method according to claim 1 including locating a pair of wooden members in opposition to said presshead and clamping the wooden members in butting relation one to the other prior to pressing the teeth of the connector plate into the wooden members.

4. The method according to claim 1 including adjusting the location of the leading portion of the connector stock relative to the cutting edge such that the cut is made between two transverse rows of teeth.

5. The method according to claim 1 including providing a guide surface comprised of a plurality of tines defining a plurality of laterally spaced recesses;

locating the teeth of the connector stock within the recesses, clamping the stock to the latter tines with the teeth of the stock within the latter recesses by engaging a clamp against the stock on the side thereof opposite the tines, and advancing the tines and the clamp to feed the connector stock into the path of movement of the presshead.

6. The method according to claim 1 wherein the presshead is movable from a retracted position to an extended position for cutting the stock and embedding the teeth of the plate into the wooden members and from the extended position for return to the retracted position, and including:

feeding the connector stock into the path of movement of the presshead in response to movement of said presshead from said extended position to said retracted position.

7. The method according to claim 1 including providing a guide surface comprised of a plurality of tines defining a plurality of laterally spaced recesses, locating the teeth of the connector stock within the recesses, clamping the stock to the latter tines with the teeth of the stock within the latter recesses by engaging a clamp against the stock on the side thereof opposite the tines, advancing the tines and the clamp to feed the connector stock into the path of movement of the presshead, the presshead being movable from a retracted position to an extended position for cutting the stock and embedding the teeth of the plate into the wooden members and from the extended position for return to the retracted position, and feeding the connector stock into the path of movement of the presshead in response to movement of said presshead from said extended position to said retracted position.

8. The method according to claim 1 wherein the steps of cutting the connector stock and pressing the teeth of the connector plate into the wooden members are performed in the same stroke of the presshead.

9. The method according to claim 1 wherein the steps of pressing the teeth of the first and second connector plates in the opposite sides of the members are accomplished substantially simultaneously with each providing a reaction force for the other, wherein the steps of cutting the connector stock to form the first connector plate and embedding the teeth thereof are performed in the same stroke of the first presshead, and wherein the steps of cutting the connector stock from the second coil to form the second connector plate and embedding the teeth thereof are performed in the same stroke of the second presshead.

* * * * *

UNITED STATES PATENT AND TRADEMARK OFFICE

CERTIFICATE OF CORRECTION

PATENT NO. : 4,033,025

DATED : July 5, 1977

INVENTOR(S) : John Calvin Jureit et al.

It is certified that error appears in the above-identified patent and that said Letters Patent are hereby corrected as shown below:

Column 9, line 26, after "cylinder" insert --197--.

Column 9, line 26, after "(FIG.4)" delete --a--.

Column 9, line 39, "118" should read --218--.

Column 10, line 24, "2541" should read --254L--.

Column 12, line 36,"platens" should read --fuse--.

Column 12, line 66, "platers" should read --platens--.

Column 13, line 53, the word after "returns" should read --contacts--.

Column 14, line 68, "extending" should read --extended--.

Signed and Sealed this

*Fourth* Day of *October 1977*

[SEAL]

*Attest:*

RUTH C. MASON
*Attesting Officer*

LUTRELLE F. PARKER
*Acting Commissioner of Patents and Trademarks*